(12) United States Patent
Andersson et al.

(10) Patent No.: US 10,654,342 B2
(45) Date of Patent: May 19, 2020

(54) PROTECTIVE WINDSCREEN ARRANGEMENT

(71) Applicant: HAMMERGLASS AB, Förslöv (SE)

(72) Inventors: Peter Andersson, Munka Ljungby (SE); Fredrik Krook, Vejbystrand (SE); Kenneth Svensson, Ängelholm (SE)

(73) Assignee: HAMMERGLASS AB, Förslöv (SE)

( * ) Notice: Subject to any disclaimer, the term of this patent is extended or adjusted under 35 U.S.C. 154(b) by 0 days.

(21) Appl. No.: 15/999,051

(22) PCT Filed: Feb. 16, 2017

(86) PCT No.: PCT/EP2017/053446
§ 371 (c)(1),
(2) Date: Aug. 16, 2018

(87) PCT Pub. No.: WO2017/140751
PCT Pub. Date: Aug. 24, 2017

(65) Prior Publication Data
US 2019/0337361 A1    Nov. 7, 2019

(30) Foreign Application Priority Data
Feb. 16, 2016   (EP) .................... 16155922

(51) Int. Cl.
*B60J 1/20*  (2006.01)
*B60J 1/00*  (2006.01)

(52) U.S. Cl.
CPC ............. *B60J 1/2094* (2013.01); *B60J 1/007* (2013.01); *B60Y 2200/41* (2013.01)

(58) Field of Classification Search
CPC ................. B60J 1/2094; B60J 1/007
(Continued)

(56) References Cited

U.S. PATENT DOCUMENTS

| 3,836,193 A | 9/1974 | Donahoe |
| 2008/0191514 A1* | 8/2008 | Liebl .................. B60J 5/02 |
| | | 296/146.1 |

(Continued)

FOREIGN PATENT DOCUMENTS

| EP | 376 192 A1 | 7/1990 |
| EP | 1 958 809 A1 | 8/2008 |

(Continued)

OTHER PUBLICATIONS

European Search Report issued in corresponding Application No. 16155922.4 dated Sep. 13, 2016.

(Continued)

*Primary Examiner* — Joseph D. Pape
(74) *Attorney, Agent, or Firm* — Haug Partners LLP

(57) ABSTRACT

A shock absorbing vehicle window arrangement (300) for a vehicle cab is provided. The shock absorbing vehicle window arrangement comprises a transparent polymer windscreen (301) having a height (Hw) and a width (Ww) and a metal frame (302, 303) comprising an inner portion (303) at least partially extending on an inside of the transparent polymer windscreen and configured to receive screws for fixating the transparent polymer windscreen. The shock absorbing vehicle window arrangement further comprises an additional transparent polymer windscreen (332) placed on the outside of the transparent polymer windscreen.

8 Claims, 5 Drawing Sheets

(58) Field of Classification Search
USPC .............................. 296/84.1, 96.14, 187.07
See application file for complete search history.

(56) References Cited

U.S. PATENT DOCUMENTS

2010/0101404 A1    4/2010  Lorenzo et al.
2011/0291443 A1*   12/2011 Murakami ................ B60J 1/06
                                                    296/190.1
2012/0139293 A1    6/2012  Antonich

FOREIGN PATENT DOCUMENTS

| JP | 61-186618 A | 11/1986 |
| JP | 1-89220 | 6/1989 |
| JP | 2-215880 | 8/1990 |
| JP | 5-16419 A | 3/1993 |
| JP | 10-114266 | 5/1998 |
| KR | 10 2009 0131594 | 12/2009 |

OTHER PUBLICATIONS

Office Action dated Feb. 5, 2019 in corresponding Japanese Application No. 2018-543369 and it's English Translation.
Office Action dated Jul. 23, 2019 in corresponding Japanese Application No. 2018-543369 and it's English Translation.
International Search Report and Written Opinion dated Apr. 21, 2017 in corresponding International Application No. PCT/EP2017/053446.

* cited by examiner

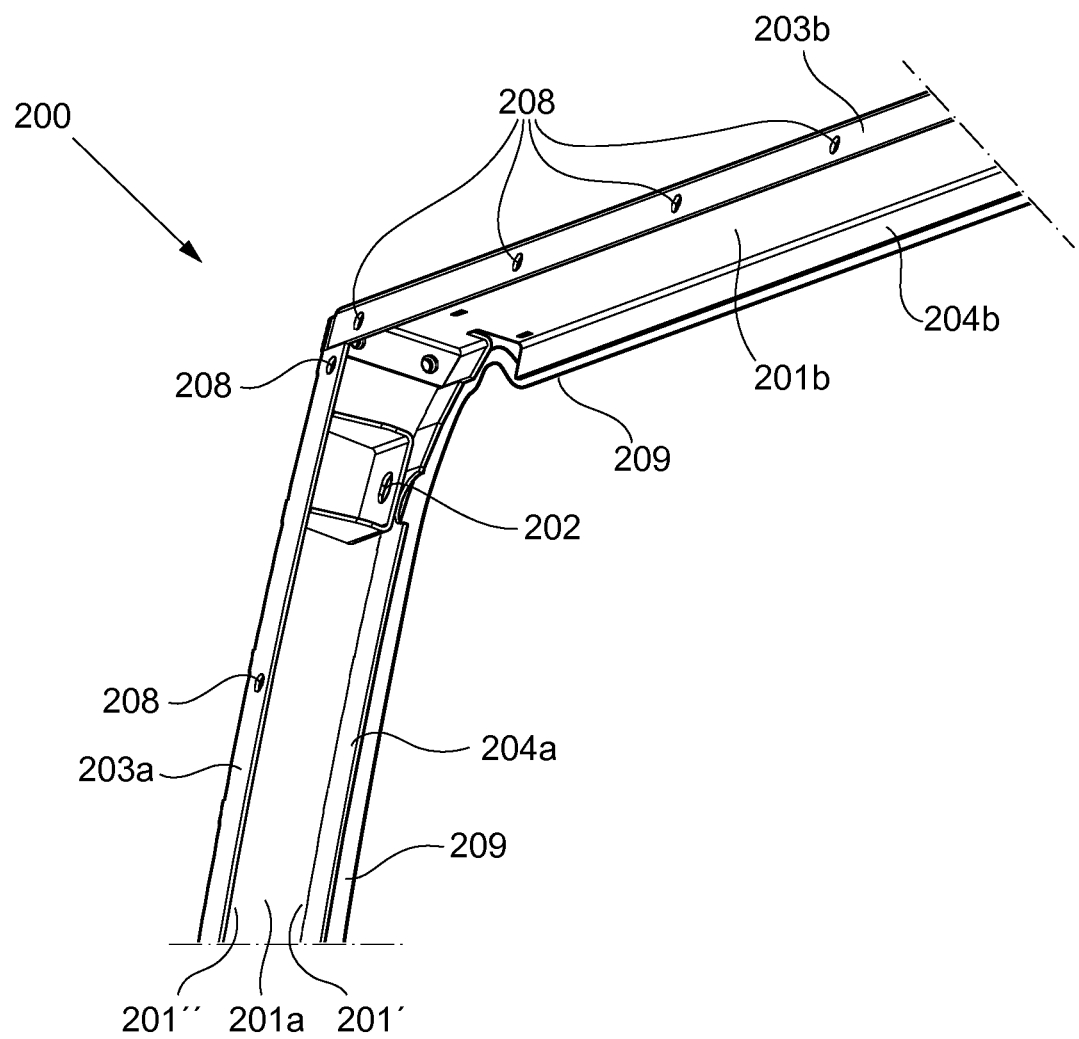

PROTECTIVE WINDSCREEN ARRANGEMENT

CROSS-REFERENCE TO RELATED APPLICATIONS

This application is the National Stage entry under 35 U.S.C. § 371 of International Application No. PCT/EP2017/053446 filed on Feb. 16, 2017, published on Aug. 24, 2017 under Publication Number WO 2017/140751, which claims the benefit of priority under 35 U.S.C. § 119 of European Patent Application Number 16155922.4 filed Feb. 16, 2016, the entireties of which are herein incorporated by reference.

FIELD OF THE INVENTION

The present invention relates to a protective windscreen arrangement and adaptor module, more specifically a protective windscreen arrangement comprising polycarbonate allowing users to feel safe, by providing a user friendly, more efficient and competitive invention.

TECHNICAL BACKGROUND

On construction sites, explosives are commonly used for altering the terrain and for demolition purposes. Construction grade explosives are most often used as several smaller charges placed in drilled holes in the rock or construction to be blasted. The charges are electrically connected to a detonator and are detonated simultaneously or in a synchronized pattern. Due to the large amount of charges, there is always a risk of one or more charges failing, which could be a result of a problem with the explosives or with the electrical connection with the detonator. When an excavator or similar heavy machinery works in the rockfill, the risk of the excavator accidentally squeezing or hitting a dud with enough force to cause it to detonate is quite substantial. Exploding duds creates a blast shock wave against the excavator and rockfill or other matter may be thrown against the excavator at speeds similar to that of a speeding bullet.

SUMMARY OF THE INVENTION

One aim of the present invention is to provide the user with a product that the end user find easy to install, is more efficient and compatible with existing equipment than the available alternatives and is safe.

Thus there is provided a shock absorbing vehicle window arrangement (300) for a vehicle cab, the shock absorbing vehicle window arrangement comprises: a transparent polymer windscreen having a height and a width, and a metal frame comprising: an inner portion at least partially extending on an inside of the transparent polymer windscreen and being curved along a surface facing the transparent polymer windscreen, the inner portion is configured to receive screws for fixating the transparent polymer windscreen, an outer portion, at least partially extending on an outside of the transparent polymer windscreen, wherein the transparent polymer windscreen comprises through holes adapted to receive fixating screws for fixating the transparent polymer windscreen to the inner portion of the metal frame, the shock absorbing vehicle window arrangement being characterized in that: the outer portion overlaps the transparent polymer windscreen with at least 0.5% of the height of the transparent polymer windscreen, the through holes having a cross sectional area being at least 1.5 times larger than the cross sectional area of the screws, enabling movement between the inner portion and the transparent polymer windscreen, and wherein the shock absorbing vehicle window arrangement further comprises an additional transparent polymer windscreen placed on the outside of the transparent polymer windscreen.

One advantage of the overlap and clearance fit through holes in the transparent polymer windscreen is that when a shockwave hits the shock absorbing vehicle window arrangement, the transparent polymer windscreen flexes in the metal frame and absorbs the shock by moving in the through holes against the support from the overlap of the inner portion of the metal frame. After an explosion, a vacuum arises at the location of the blast which creates a suction exerted on the absorbing window arrangement, causing the transparent polymer windscreen to move in the fixation in the through holes against the support from the overlap of the outer portion of the metal frame.

According to one embodiment, the inner portion further comprises a fixation interface comprising a plurality of through-holes, said fixation interface being configured to fixate the shock absorbing vehicle window arrangement to the vehicle cab.

According to one embodiment, the shock absorbing vehicle window arrangement further comprises a spacer configured to be placed in-between the transparent polymer windscreen and the additional transparent polymer windscreen interconnecting edge portions thereof, such that an enclosed space is formed between the transparent polymer windscreen, the additional transparent polymer windscreen and the spacer.

According to one embodiment, the spacer comprises a desiccant for removing moisture present in the enclosed space.

According to one embodiment, the additional transparent polymer windscreen comprises further through holes adapted to receive further fixating screws for fixating the additional transparent polymer windscreen to the metal frame.

According to one embodiment, each of the further through holes of the additional polymer windscreen are arranged to overlap a corresponding one from the through holes of the transparent polymer windscreen thus allowing the additional transparent polymer windscreen to be fixed to the inner portion of the metal frame.

According to one embodiment, the shock absorbing vehicle window arrangement further comprises an additional metal frame placed on the outside of the additional transparent polymer windscreen.

According to one embodiment, the further through holes have a cross sectional area being at least 1.5 times larger than the cross sectional area of the further fixating screws, enabling movement between the spacer and the additional transparent polymer windscreen.

A shock absorbing vehicle window arrangement for a vehicle cab is provided. The shock absorbing vehicle window arrangement comprises a transparent polymer windscreen having a height and a width. The shock absorbing vehicle window arrangement further comprises a metal frame comprising an inner portion at least partially extending on an inside of the transparent polymer windscreen and being curved along a surface facing the transparent polymer windscreen, the inner portion is configured to receive screws for fixating the transparent polymer windscreen. The shock absorbing vehicle window arrangement further comprises an outer portion, at least partially extending on an outside of the transparent polymer windscreen. The outer portion overlaps the transparent polymer windscreen with at least 0.5% of the height of the transparent polymer windscreen. The transparent polymer windscreen comprises through holes adapted to receive fixating screws for fixating the transparent polymer windscreen to the inner portion of the metal frame, the through holes have a cross sectional area being at least 1.5 times larger than the cross sectional area of the screws, enabling movement between the inner portion and the transparent polymer windscreen.

According to one embodiment, the inner portion further comprises a fixation interface configured to fixate the shock absorbing vehicle window arrangement to an adaptor module, in turn being configured to be fixated to the vehicle cab. The fixation interface is symmetric such that the shock absorbing vehicle window arrangement can be mounted to the adaptor module in at least two different orientations.

One advantage with the fixation interface being symmetric is that it makes it possible to use the same metal frame irrespective of in which orientation it is most suitable to mount the shock absorbing vehicle window arrangement.

According to one embodiment of the shock absorbing vehicle window arrangement, the fixation interface comprises a plurality of through-holes, which makes it possible to use standard screws as fixation elements.

According to one embodiment, the shock absorbing vehicle window arrangement further comprises an additional transparent polymer windscreen placed on the outside of the transparent polymer windscreen. The additional transparent polymer windscreen is configured to absorb chips and scratches that occurs in the normal operation of e.g. an excavator According to one embodiment, the shock absorbing vehicle window arrangement further comprises an accessory mounting interface for mounting at least one accessory.

According to one embodiment, the accessory mounting interface is symmetric such that the mounted accessory is oriented in the same way regardless in which of the at least two orientations the shock absorbing vehicle window arrangement is mounted to the adaptor module. The accessory mounting interface being symmetric makes it possible to have the same accessories positioned in the same way irrespective of in which orientation shock absorbing vehicle window arrangement is fixated.

According to one embodiment of the shock absorbing vehicle window arrangement, the transparent polymer windscreen comprises polycarbonate.

An adaptor module for mounting a shock absorbing vehicle window arrangement to a vehicle cab is further provided. The adaptor module comprises an inner frame portion adapted to follow the contours of the vehicle cab, an outer frame portion comprising a fixation interface for fixating the outer frame portion to a an inner portion of a metal frame of the shock absorbing vehicle window arrangement, and a perpendicularly extending sheet metal intermediate portion having an inner portion cut to follow the contours of the vehicle cab and being fixated to the inner frame portion, and an outer portion fixated to the outer frame portion. The adaptor module further comprises a cab fixation interface for fixating the adaptor module to the vehicle cab.

The adaptor module makes it possible to use the same shock absorbing vehicle window arrangement for many different vehicle types and models and makes it fast and simple to repair, remove and/or replace the shock absorbing vehicle window arrangement and/or the transparent polymer windscreen fitted therein. I.e. it enables the use of a single shock absorbing vehicle window arrangement for several vehicles and it also enables the operator of the vehicle to retain the shock absorbing vehicle window arrangement when the vehicle is replaced.

According to one embodiment of the adaptor module, the inner frame portion further comprises a compliant seal for sealing against the vehicle cab.

According to one embodiment of the adaptor module, the fixation interface is symmetric such that the shock absorbing vehicle window arrangement can be mounted to the adaptor module in at least two different orientations. One advantage with the fixation interface being symmetric is that it makes it possible to use the same adaptor module irrespective of in which orientation it is most suitable to mount the shock absorbing vehicle window arrangement.

According to one embodiment of the adaptor module, the outer frame portion is curved along the surface facing the inner portion of the metal frame of the shock absorbing vehicle window arrangement.

According to one embodiment, the fixation interface and/or the cab fixation interface comprises through holes which enables the fixation to be performed with standard screws.

A system for equipping a vehicle cab with a shock absorbing vehicle window arrangement is further provided. The system comprises a shock absorbing vehicle window arrangement comprising a transparent polymer windscreen having a height and a width. The shock absorbing vehicle window arrangement further comprises a metal frame comprising an inner portion at least partially extending on an inside of the transparent polymer windscreen and being curved along a surface facing the transparent polymer windscreen. The inner portion is configured to receive screws for fixating the transparent polymer windscreen. The shock absorbing vehicle window arrangement further comprises an outer portion at least partially extending on an outside of the transparent polymer windscreen. The outer portion overlaps the transparent polymer windscreen with at least 0.5% of the height of the transparent polymer windscreen. The transparent polymer windscreen comprises through holes adapted to receive fixating screws for fixating the transparent polymer windscreen to the inner portion of the metal frame, the through holes having a cross sectional area being at least 1.5 times the cross sectional area the screws, enabling movement between the inner portion and the transparent polymer windscreen. The inner portion further comprises a fixation interface. The system further comprises an adaptor module for mounting the shock absorbing vehicle window arrangement to the vehicle cab. The adaptor module comprises an inner frame portion adapted to follow the contours of the vehicle cab, an outer frame portion comprising a fixation interface corresponding to the fixation interface of the inner portion for fixating the outer frame portion to a the inner portion of the metal frame of the shock absorbing vehicle window arrangement, and a perpendicularly extending sheet metal intermediate portion having an inner portion cut to follow the contours of the vehicle cab and being fixated to the inner frame portion, and an outer portion fixated to the outer frame portion. The adaptor module further comprises a cab fixation interface for fixating the adaptor module to the vehicle cab.

According to one embodiment, the corresponding fixation interfaces of the shock absorbing vehicle window arrangement and adaptor module are symmetric such that the shock absorbing vehicle window arrangement can be mounted to the adaptor module in at least two different orientations.

According to one embodiment, the outer frame portion and the inner portion comprises matching curves along the surfaces facing each other.

According to one embodiment, the transparent polymer windscreen comprises polycarbonate.

The system comprising the shock absorbing vehicle window arrangement and adaptor module disclosed herein provides the end user with a versatile option allowing a more universal fit for aftermarket rebuilding/adjustment. The adaptor module makes it possible to use the same shock absorbing vehicle window arrangement for many different vehicle types and models and makes it fast and simple to repair, remove and/or replace the shock absorbing vehicle window arrangement and/or the transparent polymer windscreen fitted therein. I.e. it enables the use of a single shock absorbing vehicle window arrangement for several vehicles and it also enables the operator of the vehicle to retain the shock absorbing vehicle window arrangement when the vehicle is replaced.

Please note that the embodiments above can be combined within the scope of the appended claims unless such combinations are clearly contradictory.

BRIEF DESCRIPTION OF THE DRAWINGS

FIG. 2B shows the lower right corner of the adapter module in further detail.

DETAILED DESCRIPTION

Figure 1:
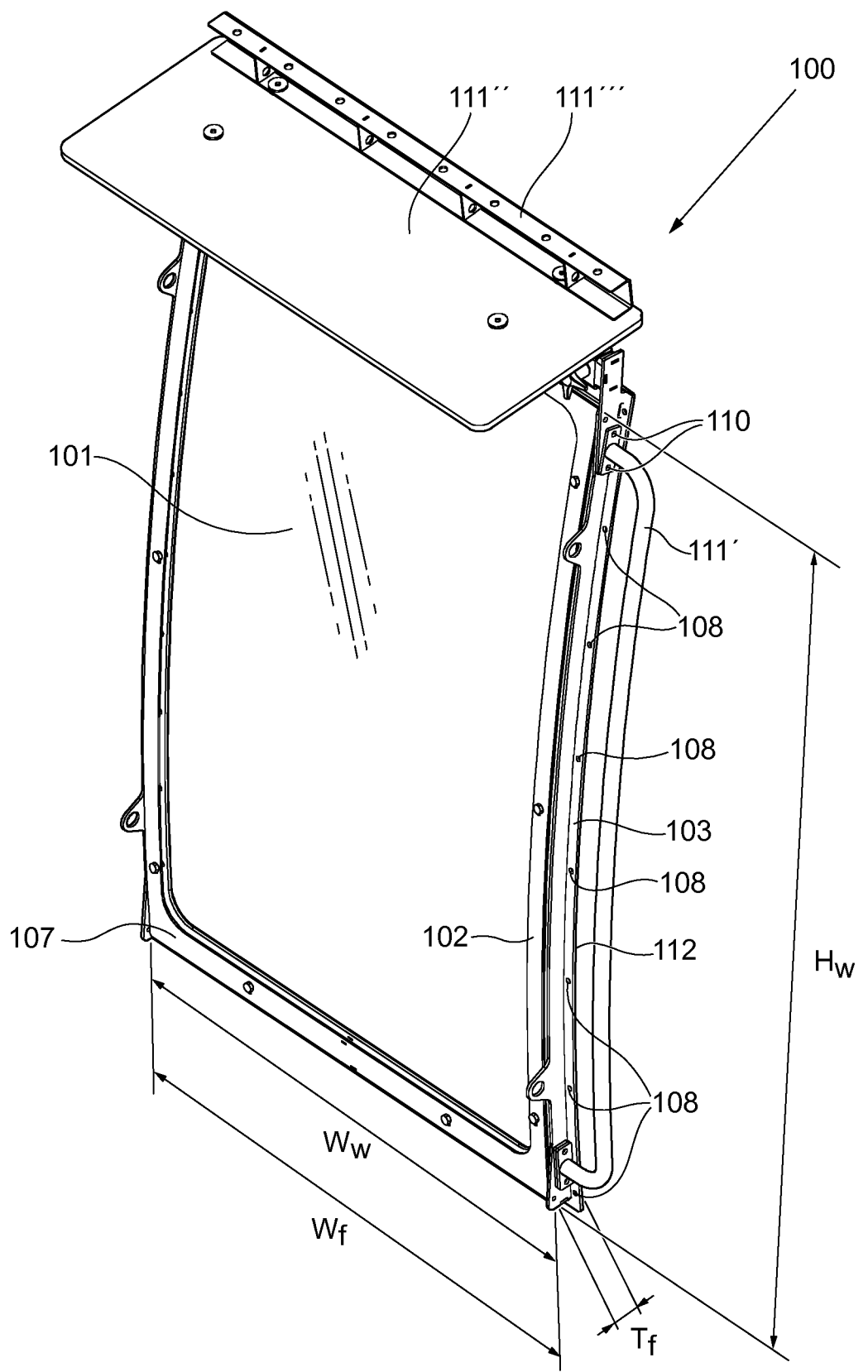
FIG. 1 shows an embodiment of a shock absorbing vehicle window arrangement for a vehicle cab in an elevated perspective view from the right.

When an excavator or similar heavy machinery works in rockfill, the risk of the excavator accidentally squeezing or hitting a dud with enough force to cause it to detonate is quite substantial. Exploding duds creates a blast shock wave against the excavator and rockfill or other matter may be thrown against the excavator at speeds similar to that of a speeding bullet. Further to that, the blast is followed by a vacuum creating a suction towards the detonation site that risks sucking the machine operator from the cab if the windscreen is damaged or comes lose.

The use of protective windscreens and safety glass has long been known. The use within armored cars and protective goggles or glasses is only a few examples of areas of use. Within the field of heavy duty equipment vehicles, there have been a long range of attempts to create safe windscreens that are able to uphold heavy impact and provide safety to the user. One problem is however that the construction often is specific for a certain vehicle and varies not only with different kinds of vehicles, but also within the same brand and/or sort of vehicle such as trailers, trucks, tractors, excavators etc. When it comes to heavy duty construction equipment, the need for a safety glass, preventing broken windows and injury caused by flying rockfill or explosions and the like is vital. Not all construction equipment is equipped with bullet proof or safety glass from the time of manufacturing. There is hence a need for an option to replace the original glass window. This implies a need for said vehicle to be rebuilt or modified in order to hold a safety glass, which in turn involves several hours in the workshop, still not necessarily leaving a satisfactory result of a perfect fit.

The shock absorbing vehicle window arrangement and adaptor module disclosed herein provides the end user with a versatile option allowing a more universal fit for aftermarket rebuilding/adjustment. The adaptor module makes it possible to use the same shock absorbing vehicle window arrangement for many different vehicle types and models and makes it fast and simple to repair, remove and/or replace the shock absorbing vehicle window arrangement and/or the transparent polymer windscreen fitted therein. I.e. it enables the use of a single shock absorbing vehicle window arrangement for several vehicles and it also enables the operator of the vehicle to retain the shock absorbing vehicle window arrangement when the vehicle is replaced.

Transparent polymer is to be understood as any polymer material able to function as a window. Transparent polymer material could for example be acrylic glass, a polycarbonate, polyethylene terephthalate, an acrylic fiber material or a copolymer containing polyacrylonitrile.

Polycarbonate is to be understood as at least one polymer comprising a carbonate group (—O(C═O)—O—). The chain may comprise a cyclic structure or linear structure that further may comprise various substances and groups such as for example, but not exclusively, F, Cl, CH3.

Flexibility is to be understood as materials ability to deform in a flexible way. A more flexible structure is to be understood as a structural element being able to endure deflection or displacement under load without plastic deformation. The flexibility of an object is referred to in relation to an original state compared to a deflection state.

Elasticity is to be understood as a materials ability to deform in an elastic way. Elastic deformation is when a material deforms under, but returns to its original shape when the stress is removed. A more elastic structure is to be understood as a structure having a lower modulus of elasticity. The elastic modulus of an object is defined as the of its stress-strain curve in the elastic deformation region. The elastic modulus is calculated as stress/strain, where stress is the force causing the deformation, divided by the area to which the force is applied; and is the ratio of the change caused by the stress.

Below, specific embodiments of the present invention are described. It will be appreciated that the drawings are for illustration only and are not in any way restricting the scope of the invention. Thus, any references to directions, such as "up" or "down", are only referring to the directions shown in the figures. It should be noted that the features having the same reference numerals have the same function a feature in one embodiment could thus be exchanged for a feature from another embodiment having the same reference numeral unless clearly contradictory. The descriptions of the features having the same reference numerals should thus be seen as complementing each other in describing the fundamental idea of the feature and thereby showing the features versatility.

FIG. 1 shows an embodiment of a shock absorbing vehicle window arrangement 100 for a vehicle cab in an elevated perspective view from the right. The vehicle cab could for example be a cab for an excavator, a dump truck, a wheel loader a roller or a crane. The shock absorbing vehicle window arrangement comprises a transparent polymer windscreen 101 having a height Hw and a width Ww, and a metal frame 102, 103 comprising an inner portion 103 at least partially extending on an inside of the transparent polymer windscreen 101 and being curved along a surface facing the transparent polymer windscreen 101. The inner portion is made from a sheet of structural steel. The inner portion 103 comprises threaded holes (shown as 113 in FIG. 3a) configured to receive screws 107 for fixating the transparent polymer windscreen 101. The threaded hole may comprise threads made directly in the material of the inner portion or may comprise a blind rivet nut fixated in a created through hole. The metal frame further comprises an outer portion 102 at least partially extending on an outside of the transparent polymer windscreen 101. The outer portion 102 shown in FIG. 1 comprises a single frame made from a sheet of structural steel, however, it is equally conceivable that the "frame" is made up of several parts e.g. right, left, upper and lower part, which are individually fixated. The outer portion 102 overlaps the transparent polymer windscreen 101 with at least 0.5% of the height Hw of the transparent polymer windscreen 101. The outer portion and the transparent polymer windscreen 101 comprises through holes 106 adapted to receive fixating screws 107 for fixating the outer portion 102 and the transparent polymer windscreen 101 to the inner portion 103 of the metal frame, such that the transparent polymer windscreen is squeezed between the outer and inner portion 102, 103. In the embodiment of FIG. 1, the through holes of the transparent polymer windscreen (shown as 106 in FIG. 3A) has a cross sectional area being at least 1.5 times larger than the cross sectional area of the screws, enabling movement between the inner portion 103 and the transparent polymer windscreen 101.

In the embodiment shown in FIG. 1, the overlap exceeds 1% of the height of the windscreen Hw, and in another conceivable embodiment the overlap exceeds 2% of the height of the windscreen Hw, and yet in another conceivable embodiment the overlap exceeds 3% of the height of the windscreen Hw.

In the embodiment shown in FIG. 1, the overlap exceeds 20 mm, and in another conceivable embodiment the overlap exceeds 10 mm, and in another conceivable embodiment the overlap exceeds 30 mm, another conceivable embodiment the overlap exceeds 40 mm.

The transparent polymer windscreen is made from Polycarbonate, which is a see through polymer material that is about 300 times as strong as ordinary glass. Polycarbonate also has a much lower weight, approximately half the weight of glass. Further, the window of the shock absorbing vehicle window arrangement may be coated with a thin layer of coating, providing higher resistance against chemicals and is more ware resistant. Said coating for example comprises an oxide of silicone, more preferably silica. The coating may provide a UV resistance up to 99.96%. Further yet, the window implies diffusion proof qualities along with self extinguishing features and is recyclable.

The inner portion 103 further comprises a fixation interface 108 configured to fixate the shock absorbing vehicle window arrangement 100 to an adaptor module (shown as 200 in FIGS. 2A, 2B and 3B) in turn being configured to be fixated to the vehicle cab. In the embodiment of FIG. 1, the fixation interface specifically comprises of a plurality of through-holes (shown in further detail as 113 in FIG. 3A) arranged on a curved protruding flange 103 made from a sheet of structural steel. The fixation interface 108 is symmetric such that the shock absorbing vehicle window arrangement can be mounted to the adaptor module in at least two different orientations, in the embodiment of FIG. 1 being at least in the orientation shown and an orientation rotated 180° (upside down). The ability to rotate the transparent polymer windscreen makes it possible to have the same metal frame irrespective of in which position it is most suitable to mount some specific accessories, such as for example the wipers. If the wiper motor (in FIG. 1 hidden under the screen 111''') blocks the operators vision too much, or is impossible to mount due to lack of space at the particular vehicle, the shock absorbing vehicle window arrangement 100 may be rotated 180° such that the wiper motor is placed at the bottom of the transparent polymer windscreen 101. Another example of accessories that in this way optionally may be mounted at the bottom instead of at the top is additional lighting. For the purpose of this application, the fixation interface being symmetric is to be understood as a functional definition. That is, the fixation interface may look different in for example an upper and lower portion but is still considered symmetric if it enables the fixation of a shock absorbing vehicle window arrangement in two different orientations. As an example, the upper portion may have stadium shaped through holes, while the lower portion may have circular holes, as long as such holes enables the fixation of a shock absorbing vehicle window arrangement in two different orientations, the fixation interface should be regarded as symmetric.

In the embodiment shown in FIG. 1, the metal frame 102, 103 of the shock absorbing vehicle window arrangement 100 further comprises an accessory mounting interface 110, which in the embodiment of FIG. 1 is a plurality of holes, for mounting at least one accessory, such as a handrail 111', a transparent screen configured to protect against rain 111'' or a rail 111''' for the mounting of additional lighting.

In the embodiment shown in FIG. 1, the accessory mounting interface 110 is partially symmetric, such that the mounted accessory is oriented in the same way regardless in which of the at least two orientations the shock absorbing vehicle window arrangement 100 is mounted to the adaptor module. Which means that e.g. the handrail 111' may be mounted on either side of the transparent polymer windscreen 101 (and on the same side in case the shock absorbing vehicle window arrangement is mounted upside down), and the rail 111''' for the mounting of additional lighting may be mounted at the bottom of the transparent polymer windscreen 101.

When the shockwave of a nearby detonation hits the window arrangement 100, the transparent polymer window 101 flexes in the metal frame 102, 103 and absorbs the shock by moving in the through holes (shown as 106 in FIG. 3A), against the support from the inner portion of the metal frame 103. After the explosion a vacuum arises at the location of the blast which creates a suction exerted on the absorbing window arrangement 100. At this time, the transparent polymer windscreen 101 moves in the fixation in the through holes against the support from the outer portion 102 of the metal frame.

Dusty environments and multiple stone chips may be hard on machine windscreens. In really tough conditions, it may be beneficial to add further protection to the transparent polymer windscreen 301, such as to prolong its life expectancy. For this purpose, a so called a sacrifice windscreen may be used. The sacrifice windscreen may be arranged outside of the transparent polymer windscreen thus providing protection from dust and sand. Thus, the shock absorbing vehicle window arrangement may further comprise an additional transparent polymer windscreen (a so called sacrifice windscreen) placed on the outside of the transparent polymer windscreen. The sacrifice windscreen is configured to absorb chips and scratches that occurs in the normal operation of e.g. an excavator. The sacrifice windscreen is comparably cheap and easy to replace when it becomes scratched.

Figure 3A:
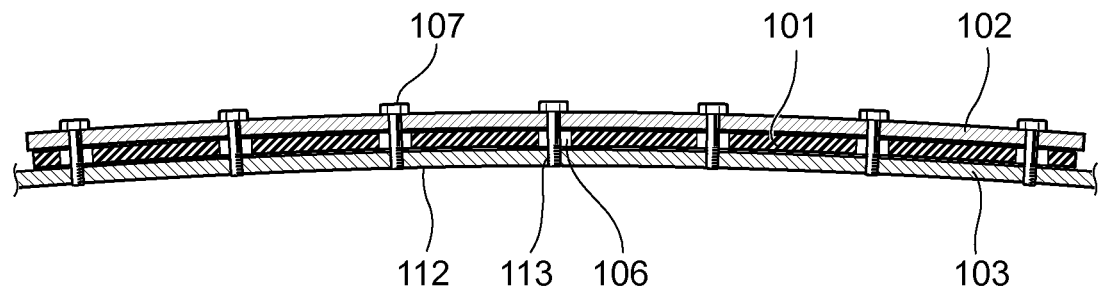
FIG. 3A shows a sectional detailed view of the horizontally extending parts of the inner and outer portions of the metal frame.
Figure 4A:
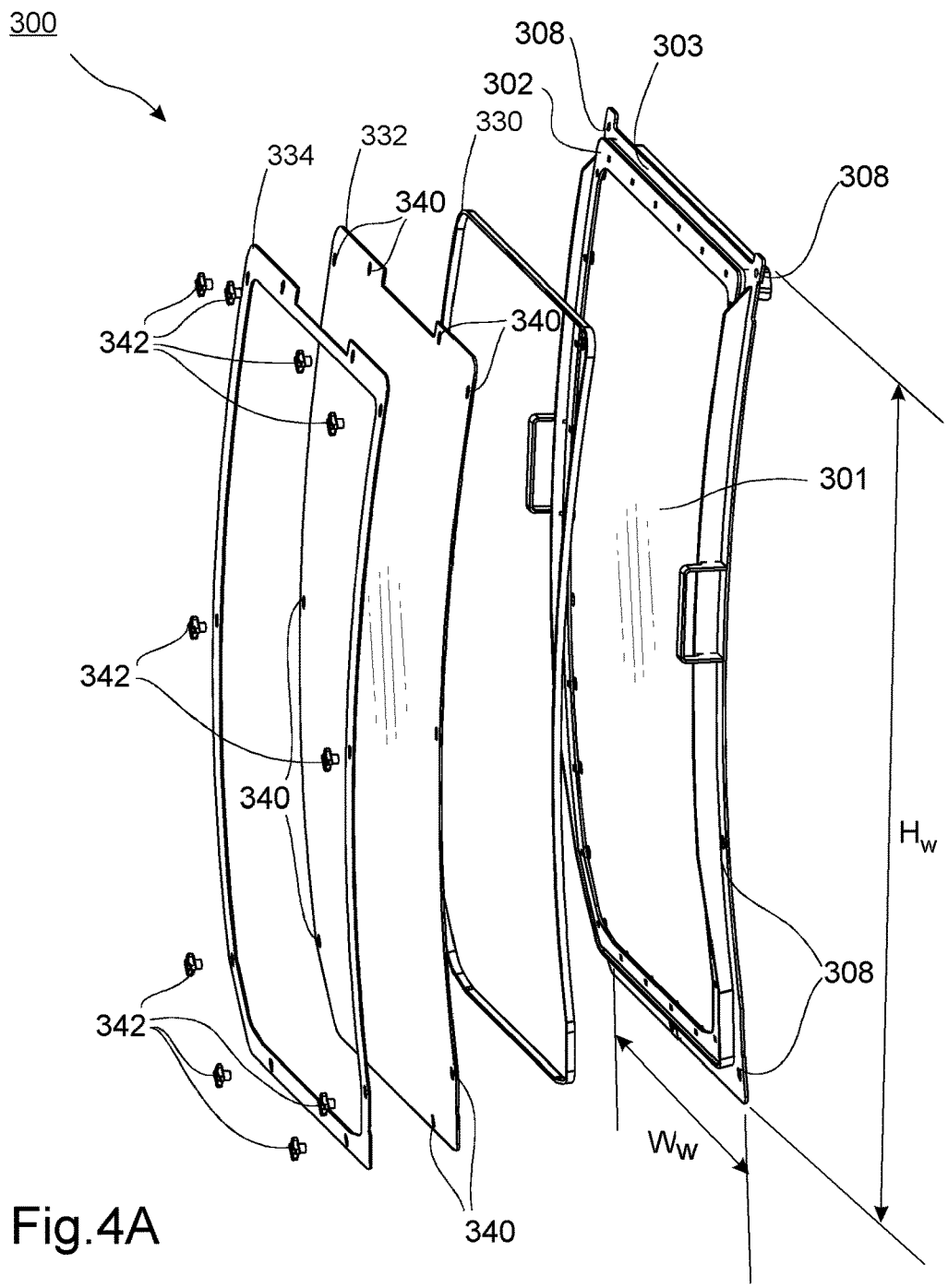
FIG. 4A shows an alternative embodiment of a shock absorbing vehicle window arrangement for a vehicle cab in an elevated perspective view from the right.

FIGS. 4*a* and *b* shows an alternative embodiment of a shock absorbing vehicle window arrangement 300 for a vehicle cab. The shock absorbing vehicle window arrangement 300 comprises a transparent polymer windscreen 301 having a height Hw and a width Ww, and a metal frame 302,303. The metal frame 302,303 comprises an inner portion 303 at least partially extending on an inside of the transparent polymer windscreen 301 and being curved along a surface facing the transparent polymer windscreen 301. The inner portion is made from a sheet of structural steel. The inner portion is configured to receive screws for fixating the transparent polymer windscreen 301. The inner portion 303 comprises threaded holes similar to what is shown in FIG. 3*a* for the shock absorbing vehicle window arrangement 100. The threaded hole may comprise threads made directly in the material of the inner portion or may comprise a blind rivet nut fixated in a created through hole. The metal frame 302,303 further comprises an outer portion 302, at least partially extending on an outside of the transparent polymer windscreen 301. The outer portion 102 shown in FIG. 4 comprises a single frame made from a sheet of structural steel, however, it is equally conceivable that the "frame" is made up of several parts e.g. tight, left, upper and lower part, which are individually fixated. The outer portion 302 overlaps 0 the transparent polymer windscreen 301 with at least 0.5% of the height Hw of the transparent polymer windscreen 301. The transparent polymer windscreen 301 comprises through holes 306 adapted to receive fixating screws 307 for fixating the transparent polymer windscreen 301 to the inner portion 303 of the metal frame, such that the transparent polymer windscreen 301 is squeezed between the outer and inner portion 302, 303. The through holes 306 have a cross sectional area being at least 1.5 times larger than the cross sectional area of the screws, enabling movement between the inner portion 303 and the transparent polymer windscreen 301.

The shock absorbing vehicle window arrangement 300 further comprises an additional transparent polymer windscreen 332 (a so called sacrifice windscreen) placed on the outside of the transparent polymer windscreen 301. The purpose of the additional transparent polymer windscreen 332 is to protect the transparent polymer windscreen 301 thus prolonging its life expectancy. The additional transparent polymer windscreen 332 is relatively easy to replace. Thus, in case of damage of the additional transparent polymer windscreen 332, such as for example by excessive wear due to sand and dust. The further transparent polymer windscreen 332 may comprise the same type of material as the transparent polymer windscreen 301, i.e. polycarbonate, but may, alternatively comprise another polymeric material. To facilitate convenient replacement, it the additional transparent polymer windscreen 332 is lighter than the transparent polymer windscreen 301. Thus, in the embodiment, the thickness of the additional transparent polymer windscreen 332 is less than the thickness of the transparent polymer windscreen 301. For example, the thickness of the additional transparent polymer windscreen 332 may be within the range 3-8 mm whereas the thickness of the transparent polymer windscreen 301 may be in the range 9-14 mm. According to some embodiments, the thickness of the additional transparent polymer windscreen 332 is 4 mm or 6 mm and the thickness of the transparent polymer windscreen 301 is 12 mm.

The shock absorbing vehicle window arrangement 300 further comprising a spacer 330 configured to be placed in-between the transparent polymer windscreen 301 and the additional transparent polymer windscreen 332. This will ensure that an enclosed space is formed between the transparent polymer windscreen 301, the additional transparent polymer windscreen 332 and the spacer 330. The purpose of the spacer 330 is to provide a uphold a distance between the transparent polymer windscreen 301 and the additional transparent polymer windscreen 332 such as to prevent them coming in direct contact with each other risking noise and/or material damage. A further purpose of the spacer 330 is to provide a seal around the enclosed space. Providing a seal helps protecting the transparent polymer windscreen 301 from damage for example by sand and dust entering the region between the transparent polymer windscreen 301 and the additional transparent polymer windscreen 332. The seal further helps preventing water penetration. For this purpose the spacer may be a rubber seal. The spacer comprises a desiccant for removing moisture present in the enclosed space. The desiccant will remove traces of humidity from the enclosed space so that no water appears on the inside surfaces (no condensation) of the windscreens facing the air space for example during cold weather. The desiccant is arranged such as to be present within the enclosed space once the additional transparent polymer windscreen 332 has been mounted onto the frame 302,303. The desiccant may comprise for example silica, calcium sulphate calcium chloride or molecular sieves such as zeolites. The spacer 330 fits tightly against the outer portion 302 of the metal frame. The spacer is placed along an edge of the outer portion 302 of the metal frame and the additional transparent polymer windscreen 332 is mounted onto the frame 302,303 with screws as shown in FIGS. 4*a* and *b*.

The additional transparent polymer windscreen 332 comprises further through holes 340 adapted to receive further fixating screws 341 for fixating the additional transparent polymer windscreen 332 to the metal frame 302,303. Each of the further through holes 340 of the additional polymer windscreen 332 are arranged to overlap a corresponding one from the through holes 306 of the transparent polymer windscreen 301 thus allowing the additional transparent polymer windscreen 332 to be fixed to the inner portion 303 of the metal frame 302,303. As can be seen in FIGS. 4*a* and *b*, not everyone from the through holes 306 of the transparent polymer windscreen 301 are overlapping a further through hole 340 of the additional transparent polymer windscreen 332. Some of the through holes 306 of the transparent polymer windscreen 301 are only used for fixating the transparent polymer windscreen 301 to the inner portion 303 of the metal frame. The remaining ones from the through holes 306, which are overlapping the further through holes of the additional transparent polymeric windscreen 332, are used for fixating the additional transparent polymeric windscreen 332 to the inner portion 303 of the metal frame. The further fixating screws thus protrudes through both the additional transparent polymeric windscreen 332 and the transparent polymeric windscreen 301.

The further fixating screws 341 are thus longer than the fixating screws 307. Furthermore, the further fixating screws 341 may be arranged to be fixedly attached to the inner portion of the metal frame at all times, thus making replacement of an additional transparent polymeric windscreen 332 easier by the further fixating screws 341 effectively guiding the additional transparent polymeric windscreen 332 into place.

Figure 4B:
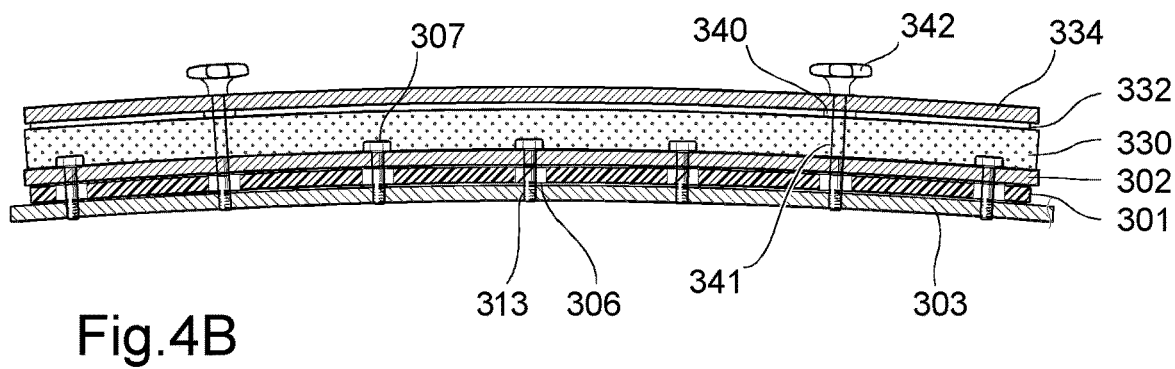
FIG. 4B shows a sectional detailed view of the horizontally extending parts of the shock absorbing vehicle window arrangement of FIG. 4A.

As can be seen in FIG. 4B, the further through hole 340 in the additional transparent polymer windscreen 332 is substantially larger than the further fixating screw 341 such that a clearance fit is achieved, such that the additional transparent polymer windscreen can move in relation to the metal frame and/or spacer and thereby absorb the shock from e.g. a blast. In the embodiment shown in FIG. 4B, the through holes have a cross sectional area exceeding 1.5 times the size of the screw to be placed in the through hole, however, in alternative embodiments, the through holes may have a cross sectional area exceeding 2 times the size of the screw to be placed in the through hole, or exceeding 3 times the size of the screw to be placed in the through hole, or exceeding 4 times the size of the screw to be placed in the through hole. The further through holes 340 may have a circular cross section. Alternatively, the further through holes 340 may have an oblong cross section, such as to allow the additional transparent polymer windscreen to move in relation to the metal frame and/or spacer to a larger extent in a first direction than in a second direction, said first direction and said second direction being perpendicular to each other and arranged within a plane of the additional transparent polymeric windscreen.

The additional transparent polymeric windscreen 332 is secured to the inner portion 303 of the metal frame by nuts. To facilitate easy removal, the nuts may comprise an outer portion easily maneuvered by hand. This may be achieved by using clamping knobs. Such clamping knobs may have different shape and structure, examples of clamping knobs being: textured nylon knobs, knobs with three to nine lobes including star knobs, triangular knobs, wing nuts and wing screws, as well as different types of knurled knobs. For the example embodiment in FIGS. 4*a* and *b*, the clamping knobs are four-handled star knobs. The shock absorbing vehicle window arrangement 300 further comprises an additional metal frame 334 placed on the outside of the additional transparent polymer windscreen 332. The additional metal frame 334 provides support and protection for the additional transparent polymeric windscreen 332 by distributing the forces exerted into the transparent polymeric windscreen 332 by the screws 341. Hence, the additional metal frame 334 comprises through holes 340 overlapping the through holes 430 of the additional transparent polymeric windscreen 332.

Figure 2A:
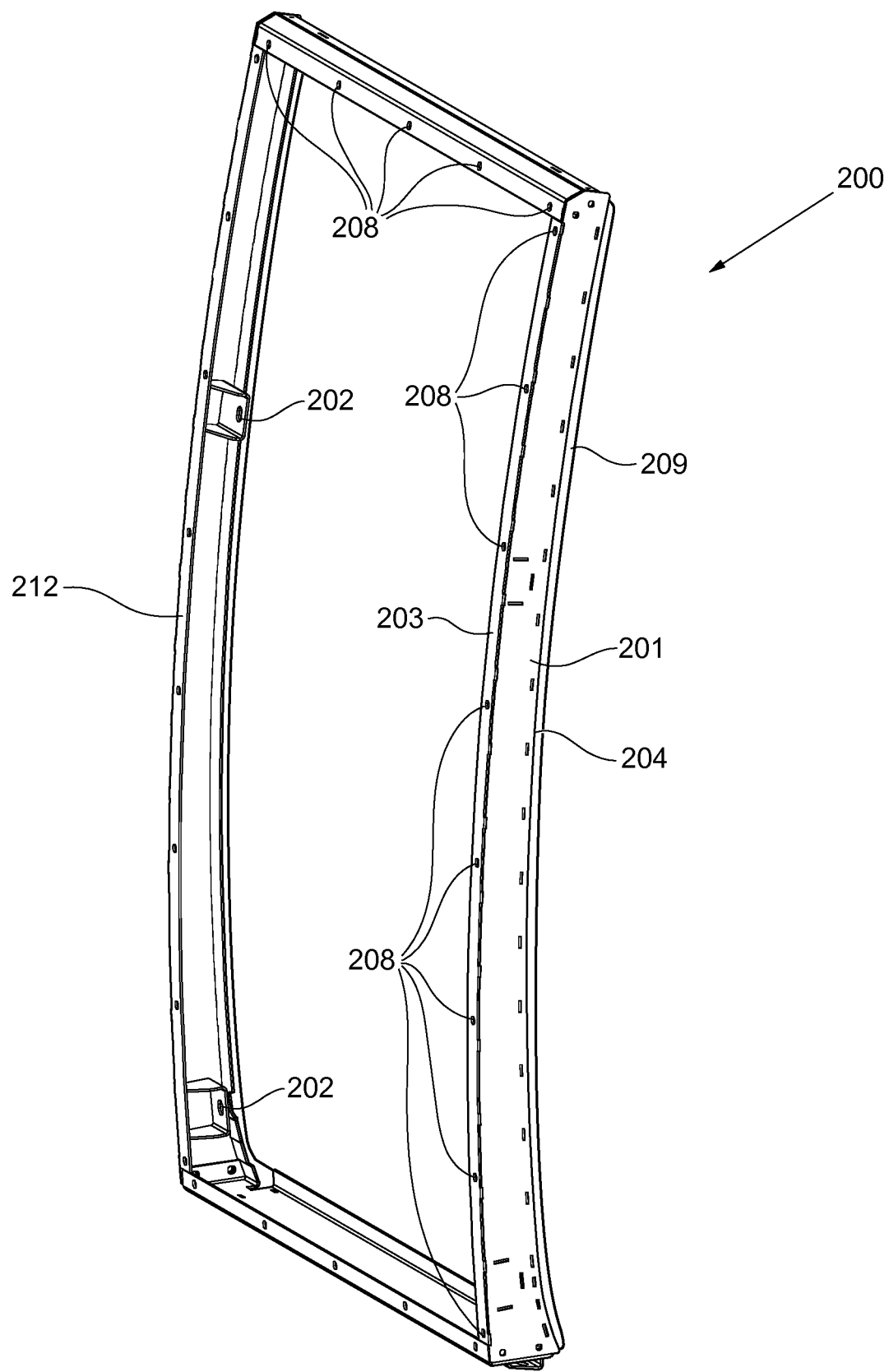
FIG. 2A shows an embodiment of an adaptor module for mounting a shock absorbing vehicle window arrangement to a vehicle cab, in an elevated perspective view from the right.

FIG. 2A shows an embodiment of an adaptor module 200 for mounting a shock absorbing vehicle window arrangement to a vehicle cab, in an elevated perspective view from the right. The vehicle cab could for example be a cab for an excavator, a dump truck, a wheel loader a roller or a crane. The adaptor module 200 comprises an inner frame portion 204 being a sheet of structural steel extending with its widest surface against the surface of the vehicle cab. The inner frame portion 204 is adapted to follow the contours of the vehicle cab, i.e. in the embodiment of FIG. 2A, the inner frame portion 204 is bent to follow the contours of the vehicle cab. On the inner frame portion 204, a compliant sealing is fixated, e.g. by means of gluing. The compliant seal is for example an elastic polymer seal, such as a rubber seal. The seal is adapted to create a water proof fixation of the adaptor module against the surface of the vehicle cab.

The adaptor module further comprises an outer frame portion 203 being a sheet of structural steel extending with its widest surface in the direction perpendicularly away from the surface of the vehicle cab, for creating a wide contacting surface against a shock absorbing vehicle window arrangement to be mounted to the adaptor module 200. The outer portion 203 comprises a fixation interface 208 for fixating the outer frame portion 203 to an inner portion of a metal frame of the shock absorbing vehicle window arrangement (103, 100 of FIG. 1).

In the embodiment of FIG. 2A, the outer frame portion 203 is curved 212 along the surface facing the inner portion of the metal frame of the shock absorbing vehicle window arrangement, and for a tight fit, the inner portion of the shock absorbing vehicle window arrangement should have the corresponding curve.

In the embodiment of FIG. 2A, the fixation interface 208 comprises an arrangement of through holes 208 corresponding to the though holes of the inner portion of the shock absorbing vehicle window arrangement, such that fixation screws can be used to fit and fixate the curved surface of the inner portion of the shock absorbing vehicle window arrangement to the curved surface of the outer frame portion 203 of the adaptor module.

The adaptor module 200 further comprises a perpendicularly extending sheet metal intermediate portion 201 having an inner portion 201' cut to follow the contours of the vehicle cab and being fixated, e.g. welded, to the inner frame portion 204, and an outer portion 201" cut to follow the curve 212 of the outer frame portion 203, and being fixated, e.g. welded, to the outer frame portion 203. The sheet metal intermediate portion 201 creates a distance between the inner and outer frame portions 204, 203 and is cut and adapted such that the distance is specifically adapted to the vehicle to which the adaptor module 200 is to be mounted. By means of the adaptor module, the same simple fixating interface 208, and the same curve 212 can be placed on any vehicle cab, irrespectively of how complex the geometry of that specific vehicle cab is, meaning that the same shock absorbing vehicle window arrangement can be used for any vehicle having a mounted adaptor module 200.

Turning again to the details of FIG. 2A, the inner portion 204, outer portion 203, sheet metal intermediate portion 201 and compliant seal 209 all create a closed geometry surrounding the vehicle window to which the adaptor module 200 is mounted, such that the originally mounted windscreen can be removed and replaced. The adaptor module 200 together with the shock absorbing vehicle window arrangement is a sealed unit becoming part of the inside of the vehicle cab thus forming a bay window capable of protecting the operator positioned in the vehicle cab substantially without impairing the visual range of the operator.

The adaptor module 200 further comprises a cab fixation interface 202 for fixating the adaptor module 200 to the vehicle cab. In the embodiment of FIG. 2A, the cab fixation interface comprises a steel structure welded to the inside of the sheet metal intermediate portion 201 and comprising a through hole 202 configured for receiving a fixating screw for fixating and tightening the adaptor module 200 against the surface of the vehicle cab. The fixation interface 202 is in the embodiment shown in FIG. 2A configured to be aligned with the fixation holes of the vehicle cab of an excavator which are originally designed for the fixation of a protective metal wire grid.

In the embodiment shown in FIG. 2A, the fixation interface 208 is symmetric, such that the shock absorbing vehicle window arrangement can be mounted to the adaptor module in a first orientation, the orientation shown in FIG. 1, and the orientation in which the shock absorbing vehicle window arrangement is placed upside down. The symmetry makes it possible to have the same chock absorbing vehicle window arrangement irrespective of in which position it is most suitable to mount some specific accessories, such as for example the wipers. If the wiper motor (in FIG. 1 hidden under the screen 111''') blocks the operators vision too much, or is impossible to mount due to lack of space at the particular vehicle, the shock absorbing vehicle window arrangement may be rotated 180° and fixated to the adaptor module upside down, such that the wiper motor is placed at the bottom.

FIG. 2B shows the lower right corner of the adapter module 200 in further detail. In FIG. 2B a more detailed view of the element of the adaptor module is visible. The vertical inner frame portion 204a and the horizontal inner frame portion 204b are two of the four inner frame portions creating the closed geometry shown in FIG. 2A. The vertical inner frame portion 204a and the horizontal inner frame portion 204b are perpendicularly welded to the inner portion 201' of the vertical perpendicularly extending sheet metal intermediate portion 201A and the inner portion 201' of the horizontal perpendicularly extending sheet metal intermediate portion 201B, which are two of the four inner frame portions creating the closed geometry shown in FIG. 2A. The outer portions 201" of the perpendicularly extending sheet metal intermediate portions 201A, 201B are in turn perpendicularly welded to the vertical outer frame portion 203A and the horizontal outer frame portion 203b, which also are two of the four inner frame portions creating the closed geometry shown in FIG. 2A.

Further to that, the compliant seal 209, running along the surface of the inner frame portions 204A, 204B, the cab fixation interface 202, and the fixation interface 208 comprised of a plurality of though holes can be seen in further detail.

FIG. 3A shows a sectional detailed view of the horizontally extending parts of the inner and outer portions 103, 102 of the metal frame. As can be seen from FIG. 3A, the inner portion 102 has a curve 112 extending in the horizontal direction. As the transparent polymer windscreen is flexible, the transparent polymer windscreen 101 is possible to bend slightly, such that it follows the curve 112 of the inner portion. The transparent polymer windscreen 101 being flexible means that the transparent polymer windscreen can be transported in its flat state and bent when being mounted to the shock absorbing vehicle window arrangement. As can be seen from FIG. 3A, the outer portion also follows the curve 112. The outer portion 102 may be finished with a curve in manufacturing, or may just as in the case with the transparent polymer windscreen 101 be bent during mounting. In FIG. 3A it is also shown how screws 107 are mounted from the outside of the metal frame, through the through holes in the outer portion, further through the through holes 106 in the transparent polymer windscreen 101, and further into the threaded holes 113 in the inner portion 103, which squeezes and fixates the transparent polymer windscreen 101 between the inner and outer portions 102, 103. The threaded holes 113 may comprise threads made directly in the material of the inner portion or may comprise a blind rivet nut fixated in a created through hole.

Figure 3B:
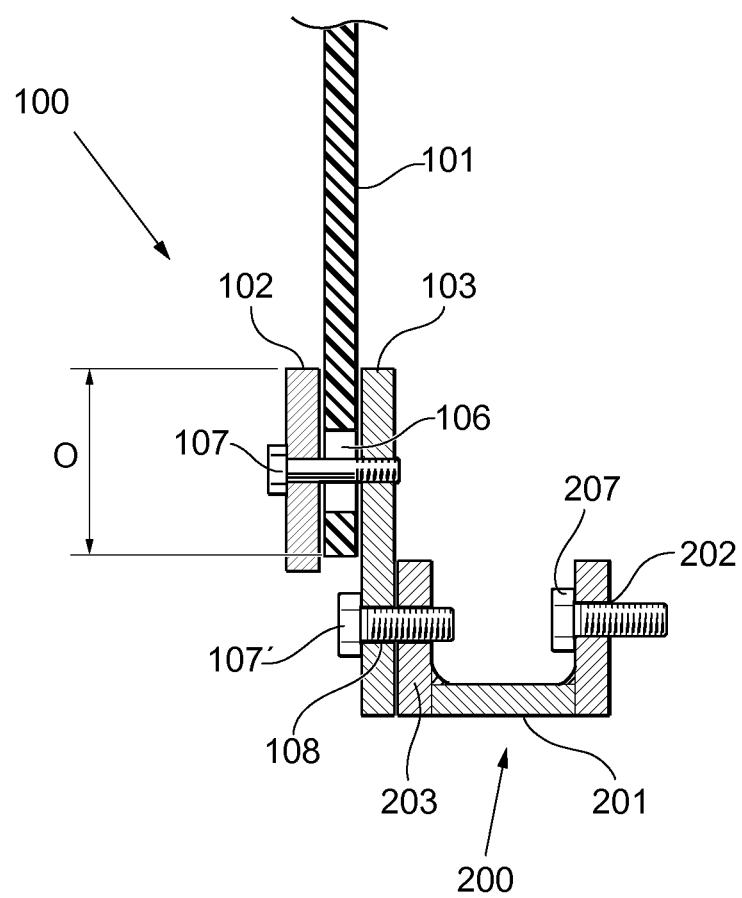
FIG. 3B shows a sectional view of the transparent polymer windscreen, the inner and outer portions of the metal frame and outer frame portion, the perpendicularly extending sheet metal intermediate portion and the cab fixation interface.

FIG. 3B shows a sectional view of the transparent polymer windscreen 101, the inner and outer portions of the metal frame 102, 103, and outer frame portion 203, the perpendicularly extending sheet metal intermediate portion 201 and the cab fixation interface 202. The sectional view shows how the adaptor module 200 is fixated to the vehicle cab by means of the screw 207, and that the shock absorbing vehicle window arrangement 100 is fixated to the adaptor module 200 by means of the inner portion 102 being fixated to the outer frame portion 203 of the adaptor module 200 by means of the screw 107'.

As can be seen in FIG. 38, the through hole 106 in the transparent polymer windscreen 101 is substantially larger than the screw such that a clearance fit is achieved, such that the transparent polymer windscreen can move in relation to the metal frame and thereby absorb the shock from e.g. a blast. In the embodiment shown in FIG. 38, the through holes have a cross sectional area exceeding 1.5 times the size of the screw to be placed in the through hole, however, in alternative embodiments, the through holes may have a cross sectional area exceeding 2 times the size of the screw to be placed in the through hole, or exceeding 3 times the size of the screw to be placed in the through hole, or exceeding 4 times the size of the screw to be placed in the through hole.

FIG. 3B further shows the overlap O between the inner and outer portions 103, 102 and the fixating the transparent polymer windscreen 101 from the outside and inside respectively. In a situation where the transparent polymer windscreen 101 is exposed to the energy of shock wave of a blast, the vacuum following the blast or force from the impact of an object against the windscreen, the inner and outer portions of the metal frame 102, 103 supports the transparent polymer windscreen 101 and makes sure that the windscreen remains fixated to the frame and thus protects the inside of the vehicle cab.

In the embodiment shown in FIG. 3B, the overlap exceeds 1% of the height of the windscreen, and in another conceivable embodiment the overlap exceeds 2% of the height of the windscreen, and yet in another conceivable embodiment the overlap exceeds 3% of the height of the windscreen. In the embodiment shown in FIG. 1, the overlap exceeds 20 mm, and in another conceivable embodiment the overlap exceeds 10 mm, and in another conceivable embodiment the overlap exceeds 30 mm, another conceivable embodiment the overlap exceeds 40 mm.

In the embodiments of FIGS. 1, 3A and 3B, the through holes are stadium shaped, which is to be understood as an example of a suitable shape for the through hole. In alternative embodiments, the through hole may have another shape, such as elliptical or circular, as long as the clearance fit is enabled.

Please note that the embodiments above can be combined within the scope of the appended claims unless such combinations are clearly contradictory.

The invention claimed is:

1. A shock absorbing vehicle window arrangement for a vehicle cab, the shock absorbing vehicle window arrangement comprises:
   a transparent polymer windscreen having a height and a width, and
   a metal frame comprising:
   an inner portion at least partially extending on an inside of the transparent polymer windscreen and being curved along a surface facing the transparent polymer windscreen, the inner portion is configured to receive screws for fixating the transparent polymer windscreen,
   an outer portion, at least partially extending on an outside of the transparent polymer windscreen, wherein the transparent polymer windscreen comprises through holes adapted to receive fixating screws for fixating the transparent polymer windscreen to the inner portion of the metal frame, the outer portion overlaps the transparent polymer windscreen with at least 0.5% of the height (Hw) of the transparent polymer windscreen, the through holes having a cross sectional area being at least 1.5 times larger than the cross sectional area of the screws, enabling movement between the inner portion and the transparent polymer windscreen, and wherein the shock absorbing vehicle window arrangement further comprises an additional transparent polymer windscreen placed on the outside of the transparent polymer windscreen, the shock absorbing vehicle window arrangement further comprising:

a spacer configured to be placed in-between the transparent polymer windscreen and the additional transparent polymer windscreen interconnecting edge portions thereof, such that an enclosed space is formed between the transparent polymer windscreen, the additional transparent polymer windscreen and the spacer, and wherein the spacer comprises a desiccant for removing moisture present in the enclosed space.

2. The shock absorbing vehicle window arrangement according to claim 1, wherein the inner portion further comprises a fixation interface comprising a plurality of through-holes, said fixation interface being configured to fixate the shock absorbing vehicle window arrangement to the vehicle cab.

3. The shock absorbing vehicle window arrangement according to claim 2, wherein the accessory mounting interface is symmetric such that the mounted accessory is oriented in the same way regardless in which of the at least two orientations the shock absorbing vehicle window arrangement is mounted to the adaptor module.

4. The shock absorbing vehicle window arrangement according to claim 1, wherein the transparent polymer windscreen and/or the additional transparent polymer windscreen comprises polycarbonate.

5. The shock absorbing vehicle window arrangement according to claim 1, wherein the additional transparent polymer windscreen comprises further through holes adapted to receive further fixating screws for fixating the additional transparent polymer windscreen to the metal frame.

6. The shock absorbing vehicle window arrangement according to claim 5, wherein the further through holes have a cross sectional area being at least 1.5 times larger than the cross sectional area of the further fixating screws, enabling movement between the spacer and the additional transparent polymer windscreen.

7. The shock absorbing vehicle window arrangement according to claim 1, wherein each of the further through holes the additional polymer windscreen are arranged to overlap a corresponding one from the through holes of the transparent polymer windscreen thus allowing the additional transparent polymer windscreen to be fixed to the inner portion of the metal frame.

8. The shock absorbing vehicle window arrangement according to claim 1, further comprising an additional metal frame placed on the outside of the additional transparent polymer windscreen.

\* \* \* \* \*